(12) United States Patent
Schillmeier et al.

(10) Patent No.: US 7,460,073 B2
(45) Date of Patent: Dec. 2, 2008

(54) RFID ANTENNA SYSTEM

(75) Inventors: Gerald Schillmeier, München (DE); Frank Mierke, München (DE); Thomas Lankes, Rosenheim (DE)

(73) Assignee: Kathrein-Werke KG, Rosenheim (DE)

( * ) Notice: Subject to any disclaimer, the term of this patent is extended or adjusted under 35 U.S.C. 154(b) by 99 days.

(21) Appl. No.: 11/785,582

(22) Filed: Apr. 18, 2007

(65) Prior Publication Data

US 2008/0258976 A1    Oct. 23, 2008

(51) Int. Cl.
*H01Q 1/38* (2006.01)
(52) U.S. Cl. ............................. 343/700 MS; 340/572.1; 340/572.7; 340/572.8
(58) Field of Classification Search .......... 343/700 MS; 340/572.1, 572.7, 572.8
See application file for complete search history.

(56) References Cited

U.S. PATENT DOCUMENTS

| | | | |
|---|---|---|---|
| 6,825,766 B2 * | 11/2004 | Hewitt et al. | 340/572.7 |
| 7,050,005 B2 | 5/2006 | Gottl et al. | |
| 2006/0017364 A1 | 1/2006 | Meissner | |
| 2006/0132312 A1 | 6/2006 | Tavormina | |
| 2007/0052521 A1 * | 3/2007 | Beedles et al. | 340/10.1 |
| 2007/0200701 A1 * | 8/2007 | English et al. | 340/572.1 |

FOREIGN PATENT DOCUMENTS

| | | |
|---|---|---|
| DE | 10256960 B3 | 7/2004 |
| EP | 0598624 A1 | 5/1994 |
| EP | 0440370 B1 | 3/1995 |
| EP | 1357635 A1 | 10/2003 |
| EP | 0956613 B1 | 9/2004 |
| EP | 1708119 A1 | 10/2006 |
| EP | 1758204 A1 | 2/2007 |
| WO | 99/30384 | 6/1999 |

OTHER PUBLICATIONS

Klaus Finkenzeller, RFID Handbook: Fundamentals and Applications in Contactless Smart Cards and Identification, Second Edition, Chapters 1.2, 1.3, 2.3 to 2.5.4 and 3.1 to 3.1.2, Copyright 2003, John Wiley & Sons, Ltd.

* cited by examiner

*Primary Examiner*—Hoang V Nguyen
(74) *Attorney, Agent, or Firm*—Nixon & Vanderhye P.C.

(57) ABSTRACT

An RFID antenna system for a goods identification system with the following features: the RFID antenna device and/or a side limit receiving this RFID antenna device comprise(s) at least two antenna, the at least two antennae for the goods identification system (GIS) consist of patch antennae, the at least two patch antennae are arranged mutually offset in the direction of the passageway or passage region, or at least with one component mutually offset in the passage direction, and the at least two patch antennae are arranged at an equal spacing from a floor area of the passageway and/or on the same horizontal plane or offset thereto, and, more precisely, in such a way that a straight line laid through the center points and/or centers of gravity of at least two adjacent patch antennae encloses an angle α with respect to a horizontal plane and/or a plane that is parallel to the floor space, which angle is ≦45°.

25 Claims, 4 Drawing Sheets

RFID ANTENNA SYSTEM

The invention relates to an RFID antenna system comprising an REID antenna device for a goods identification system (GIS) according to the preamble of claim 1.

What are known as UHF-RFID methods and systems have already become known for article detection and identification (GIS). In this case goods to be detected are provided with an RFID tag. With respect to a method for electronic article surveillance (what is referred to as an EAS system) that is also known, this method first of all provides the fundamental advantage that it is not only possible to evaluate a single bit as information by means of an RFID tag, rather these UFH-RFID tags are provided with a microchip on which information with a word length of several places can be stored and read out therefrom. What are known as passive RFID tags are preferably used which for reading-out the tag content and sending back the corresponding information obtain their energy from the electromagnetic field of the antenna system. The RFID tag comprises an antenna structure with said microchip. As is known, what is referred to as a reader is used to read-out information, which reader, via an antenna system for example, is supplied the tags with the energy necessary for operation by way of the electromagnetic field, the tags provided with the microchip then being able to emit an appropriate response to the stored information by using this energy, it being possible to read and evaluate the response via an antenna system and an REID reader connected downstream.

With respect to the construction of an RFID antenna system for an electronic article surveillance system (EAS) reference is made by way of example to the anticipatory document WO99/30384 A1. With respect to the use of RFTD antenna systems for reading-out data in a relatively large bit length, reference is also made to the anticipatory document "3 Fundamental Operating Principles" in RFID Handbook: Fundamentals and Applications in Contactless Smart Cards and Identification, Second Edition, Klaus Finkenzeller, Copyright© 2003, John Wiley & Sons, Ltd., ISBN: 0-470-84402-7, Chapters 1.2, 1.3, 2.3 to 2.5.4 and 3.1 to 3.1.2.

Electronic article surveillance systems (EAS) to secure goods, for example at the exit to department stores, shops, etc. have also become known. These systems consist of RFID antenna systems which are arranged at a spacing from each other in the region of the exit or a passage and between which the passageway for monitoring is formed.

The corresponding products and goods obtainable in a shop are secured for example by means of an electronic retail security tag. If the goods are properly paid for the corresponding retail security tag is removed by the sales staff, so the customer can pass with the goods through the monitored exit passage without problems.

If the goods are taken through the monitored exit route while still in the secured state, an acoustic warning signal is usually emitted in the monitored region in order to signal for example that an attempt is being made to take goods that have not been paid for out of the shop.

These electronic retail security systems can be produced on a different technical basis.

The above-mentioned EAS systems operate in the manner of a 1-bit transponder in which the existence or non-existence of a specific tag can be recognized in the monitored and reading region.

The object of the present invention is therefore to create an improved RFID antenna system for a goods identification system (GIS) for reading-out tags provided with a microchip. This should involve a basically simply constructed system. If necessary it should also be possible to easily adapt the system to different circumstances and peculiarities in order to obtain optimal results with respect to reading-out information from corresponding tags In a preferred embodiment of the invention it should also be ensured that the antenna system according to the invention can also be retrofitted in a conventional electronic article surveillance system (EAS).

The object is achieved according to the invention in accordance with the features disclosed in claim 1. Advantageous embodiments of the Invention are recited in the subclaims.

The electronic goods identification system (GIS) according to the invention is distinguished on the one hand by the simple construction and its high degree of flexibility and adaptability to different circumstances and peculiarities in situ. The monitored and reading region may be differently adjusted in such a way that malfunctions may be reliably avoided.

The improved system according to the invention operates on the basis of RFID technology.

To achieve a simply constructed system with a high "hit rate" and high functional efficiency it is provided according to the invention that the antenna system provided at the side of a transit region to be monitored comprises at least two antennae, these at least two antennae being arranged side by side in the passage direction, or at least with one component side by side in the passage direction. They do not have to be arranged at the same level (i.e. for example parallel to the level of the passageway), instead some may also be positioned at different levels. However, a straight line laid through the center points or centers of gravity of the two antenna systems arranged adjacent to each other should have an angular difference, with respect to a horizontal plane (or a plane running parallel to the passageway) which is preferably not greater than 45°.

According to the invention the UHF-RFID system comprises patch antennae or consists of patch antennae. These have a particularly low overall height and can therefore be retrofitted without problems into existing EAS antenna system devices, which frequently comprise frame-like antennae, for example within the frame-like antennae of the existing EAS surveillance system.

The arrangement of two patch antennae which are arranged laterally offset in the passage direction or are arranged with one component mutually offset in the passage direction, means that improved bundling of monitored region may be achieved with simple means. This provides significant advantages in this respect since goods or products accordingly provided with tags are only detected and read-out if a person actually walks through the defined reading region (i.e. the monitored region) with a product equipped with an RFID tag comprising a microchip and not when they are merely passing in the vicinity of this reading region. This primarily ensures that no premature detection is triggered, for example, by a person merely walking past the immediate vicinity of the passage secured by two laterally erected antenna systems (for example while still in the shop), and in the process a product secured with a tag can arrive in the detection and/or reading region of the antenna system.

The patch antennae according to the invention can be constructed as individual patch antennae. They can however also be constructed as combined patch antennae which are constructed for example on a common ground plane, on a common substrate, etc., so only the patch planes on this substrate are arranged so as to be separate from each other. Any desired modifications are possible here.

In a particularly preferred embodiment of the invention at least two pairs of patch antennae are arranged one above the other, for example on each side antenna device, i.e. on two different levels or planes (it being possible, as mentioned above, for the patch antennae that cooperate in pairs respectively to not necessarily be arranged at the same level but to be mutually offset, at least to the given extent).

However it is just as possible for not just two but a plurality of antennae, for example three or more patch antennae, to be used in the passage direction in order to hereby reduce the bundling region and therewith the narrowing of the monitored region in the direction of the passageway to an optimally narrow passage zone.

In addition to the above-mentioned preferred variants it has also proven advantageous to use additional antennae devices, in particular patch antennae, used for detection, optionally in the lower transition region from the lateral limiting devices that receive the antenna systems to the floor space (and/or to the ceiling space), likewise again in a preferably paired arrangement, and, more precisely, so as to be located mutually offset in the passage direction. The patch antennae at the transition region to the floor and/or in the transition region to a ceiling can preferably be mechanically pre-adjusted such that their main direction of radiation is substantially not parallel to the plane of the passageway (the floor space) but in a deviation therefrom, are equipped with a component extending in the vertical direction. It is thereby possible therefore to slightly upwardly align for example the main direction of radiation of antenna systems that are arranged very low and to slightly downwardly align the direction of radiation of antenna systems that are arranged very high. The monitored region can thereby be optimized irrespective of the positioning of the antennae.

As an alternative or in addition it is also possible however to electronically align and/or adjust the antennae in order to, at least to a certain extent, differently pre-adjust the detection and/or reading region and thereby optimize it/them. This can be achieved for example by a predestined, or optionally also adjustable, phase offset between two patch antennae that are arranged one above the other.

It is also possible by way of a mechanical pre-adjustment and/or feeding of two patch antennae located adjacent to each other in the passage direction to carry out a phase offset, whereby the region to be monitored can be adjusted from a plane of symmetry between the two patch antennae in one direction or the other direction of the passageway.

According to the invention the patch antennae can operate so as to be linearly or circularly polarized. In particular circularly polarized operation of the patch antennae has advantages insofar as it ensures that goods equipped with REID tags are always reliably recognized and the information stored on the tags can be read-out completely and without problems irrespective of the orientation of the tag when the reading region is crossed.

This RFID system preferably operates in the UHF ranger i.e. for example in the 800 MHz to 1,000 MHz range (in particular in the 800 MHz to 950 MHz range, for example 868 MHz range). The reading range of the patch antennae can be up to 1.5 m or more (i.e. for example up to 2 m, etc.).

In a preferred embodiment of the invention it is also provided that the goods identification system (GIS) according to the invention and the associated antenna device may also be subsequently retrofitted in an existing RFID antenna system for an electronic article surveillance system (EAS) without the functionality and mode of operation of this EAS system or the goods identification system being adversely affected by retrofitting.

Further advantages, details and features of the invention emerge from the embodiments described with reference to various figures, in which in detail.

Figure 1:
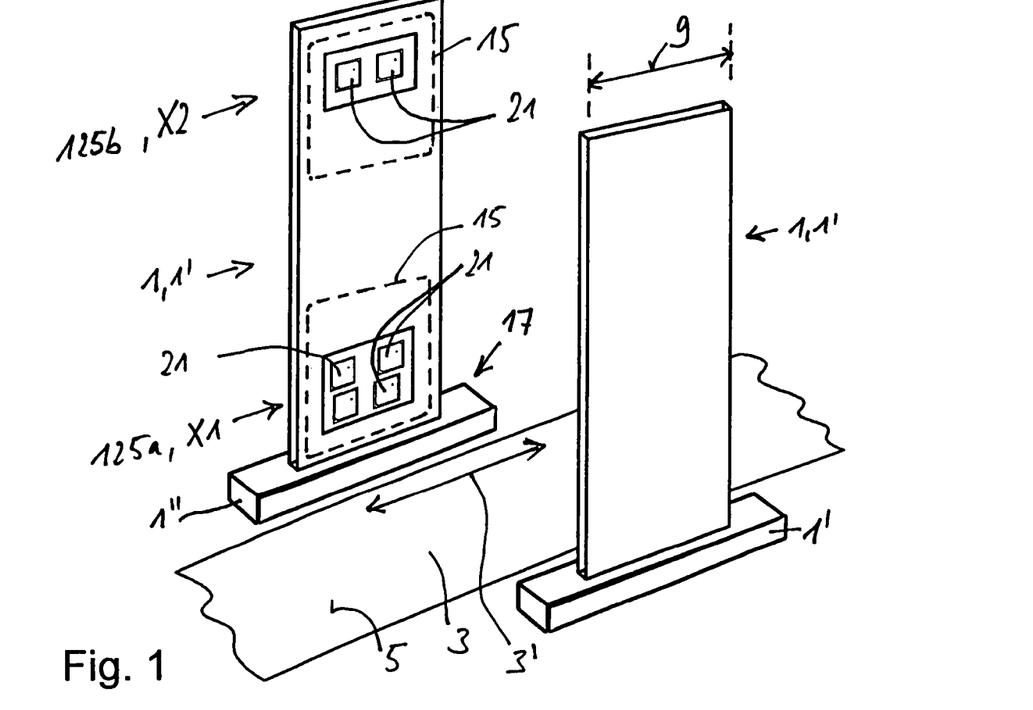
FIG. 1 shows a schematic diagram of a monitored region or passage for an electronic goods identification system (GIS)

FIG. 1 reproduces the schematic basic construction of an electronic goods identification system (GIS), and, more precisely, with two antenna devices 1 arranged so as to be mutually offset and between which a passageway 3 runs through and along the passage direction 3' on a floor space 5.

The antenna devices 1 are formed in the manner of side limits 1' which substantially comprise a height or vertical extension 7 running transversely, or in particular perpendicularly, to the floor space 5, a transverse or horizontal extension 9 running parallel, or substantially parallel, or with one component parallel, to the passageway 3 and a thickness extension 11, which is formed so as to be comparatively narrow by contrast, transverse or perpendicular to the passage direction 3 and therewith in particular parallel to the floor space 5.

FIG. 1 also shows in broken lines rectangular frame antennae 15. These do not form part of the present invention of a goods identification system (GIS). They are merely intended to illustrate that the RFID antenna assembly according to the invention for a goods identification system (GIS) can also be accommodated in a side limit 1' in which, for example, an antenna device for a conventional electronic article surveillance system (EAS) is also housed, and, more precisely, for example by using rectangular frame antennae 15.

A transmission and/or evaluation unit 17 is preferably provided in the foot region 1" of this side limit 1.

If the antenna devices according to the invention for the electronic goods identification system (GIS) described in more detail below is to be retrofitted in an existing electronic article surveillance system (EAS), reference is made with regard to EAS systems of this type to the systems known in the prior art. Systems of this type conventionally operate in a frequency range of for example 10 Hz to 20 kHz (if for example an electromagnetic method is used, or for example at 8 to 9 MHz (typically around 8.2 MHz), if for example a radio frequency method is used).

A UHF-RFID assembly for which additional antennae in the form of patch antennae are provided is used for the goods identification system (GIS) described in more detail below.

As stated, by using tags with microchips this system (GIS) primarily serves to detect and read-out product-based information, i.e. information about goods on which the relevant tag is provided. Ultimately however this information can also be used in a further step to ultimately also construct an electronic article surveillance device hereby (if for example the product-based information stored on the tag is read-out and compared for example with information stored via a checkout system in order to query whether a product provided with the relevant tag has already been paid for or not).

A first variant of the UHF-RFID goods identification system has already been reproduced in FIG. 1 in a schematic view.

In FIG. 1 a respective pair of patch antennae 21 is arranged in an upper region and two further pairs of patch antennae 21 in a lower region of the side limit 1' or the side antenna device 1 and, more precisely, within the frame-like frame antenna 15 in the illustrated embodiment, when viewed transversely to the side limits.

Figure 3:
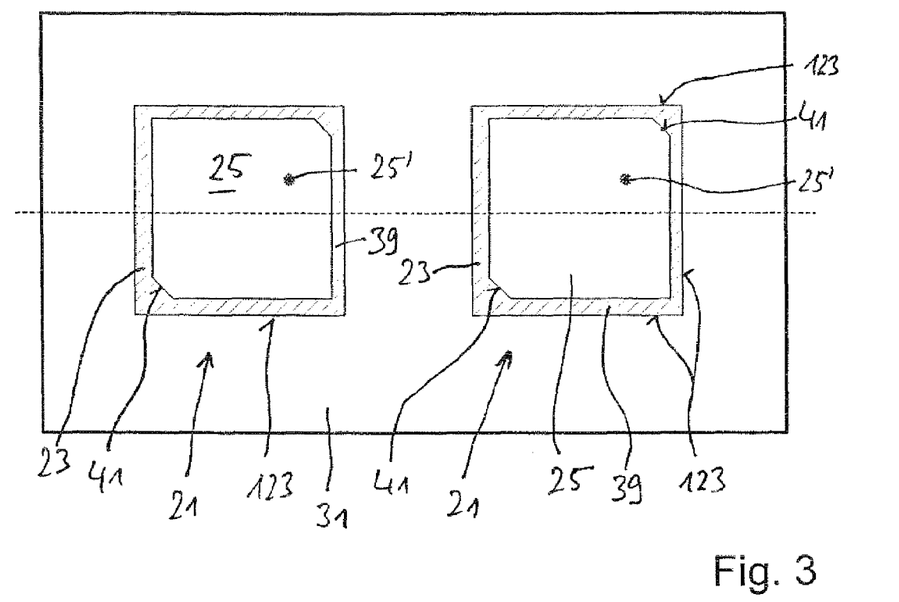
FIG. 3 shows a schematic plan view of a patch antenna pair used.
Figure 4:
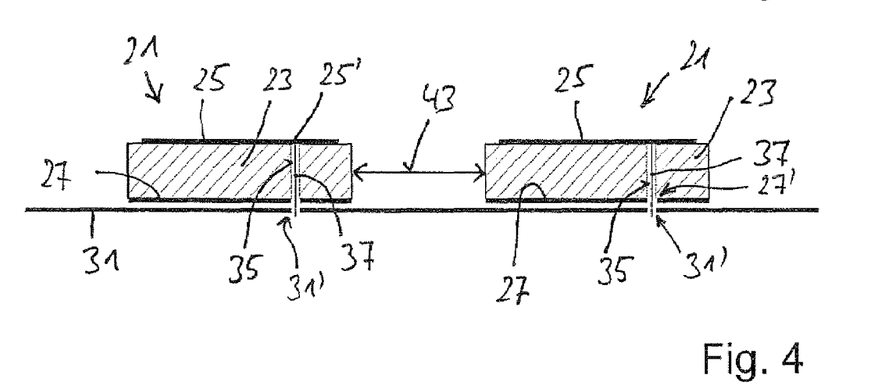
FIG. 4 shows a corresponding cross-sectional view, parallel to the passage direction, onto the patch antenna pair reproduced in FIG. 3.

The patch antennae are antennae which, according to the illustration of FIG. 3 in a perpendicular plan view and in FIG. 4 in a transverse view, comprise a substrate 23 (made of dielectric material or for example air), an upper patch plane 25 and a lower patch plane 27 being provided above or under this substrate 23, respectively. The patch plane 25 and the ground plane 27 are arranged at a spacing 23' from each other that corresponds to the thickness of the substrate 23.

As may also be seen from the graphical illustration and in particular from FIG. 4, the two patch antennae 21 are arranged parallel and upstream of a ground plane 31 and, more precisely, in such a way that the lower ground plane 27 of the respective patch antenna 21 comes to rest so as to be electrically isolated from the ground plane 31 (i.e. in a capacitive arrangement thereto). In plan view the ground plane 31 projects beyond the patch antennae and protrudes laterally beyond the patch antennae in all directions. The ground plane 31 can be made for example from metal or a metal sheet or for example from a printed circuit board coated with copper.

The fact that the ground plane 27 of the patch antenna 21 is electrically isolated from the common ground plane 31 is taken into account in particular if conventional patch antennae are used which, for example, are glued to the ground plane 31 by using an adhesive (if this is not electrically conductive). Basically by producing a d.c. or conductive contact a said patch antenna could also be placed directly with its lower ground plane 27 on the ground plane 31. It is basically also possible for example to omit the ground plane 27 that is situated on the substrate, that is to say if the patch antenna is constructed directly with its substrate on the ground plane 31.

In the described embodiment a through-opening 31' is moreover formed in the lower common ground plane 31 and in the respective ground plane 27 that forms part of the patch antenna 21 a through-opening 27' that is congruent therewith and a through-channel 35 that runs through the substrate 23, so a feeder 37 which is electrically-conductively connected at a feeding point 25' to the patch plane 25 located thereabove runs through this entire arrangement.

As an alternative a capacitive coupling to the patch plane 25 in the region of the feeding point 25' is also possible however. Finally, feeding of the patch plane 25 is also possible such that for example the feeder 37 is connected to the patch plane, for example at the edge of the patch plane, so as to rest and/or run on the surface of the substrate 23 (i.e. plane parallel to the plane of the patch plane). The patch plane can however also comprise a U-shaped recess or the like for example, so the feeder running in the plane of the patch plane 25 is electrically connected, for example at the end of the U-shaped recess (i.e. so as to lie more inwardly offset than the peripheral edge of the patch plane), to the patch plane.

In the illustrated embodiment the bottom ground plane 27 extends up to the peripheral side face 123 of the substrate 23, whereas the patch plane 25 that can be seen in plan view according to FIG. 3 ends at a spacing 39 in front of the side limit or side plane 123 of the substrate 23, i.e. in plan view is constructed with smaller lengthwise and transverse extensions than the lower ground plane 27 of patch antenna 21.

In the illustrated example the at least approximately rectangular plane of the patch antenna 21 is provided at two diagonally opposing corners with a bevel 41 which is used to adjust the antenna.

If air is used as the substrate 23 corresponding dielectric spacers that serve merely to mechanically hold the patch plane 25 are used, whereby the patch plane 25 is held and fixed at a spacing from the ground plane 21.

Two patch antennae formed in this way according to the embodiment in FIGS. 3 and 4 are arranged at a lateral spacing 43 (i.e. in an interior lateral spacing 43 between two side limit faces 123, which point toward each other, of the two adjacent patch antenna) and, more precisely, on a common ground plane 31.

In the illustrated embodiment the spacing between the two center points of the patch antennae or the centers of gravity of the two patch antennae are designated 45.

This center spacing 45 should be greater than or equal to 0.2 times $\lambda$ (lambda), based on the operating frequency used of the patch antennae, preferably the middle wavelength of the frequency used, namely for example at 0.2×34 cm=5 cm.

An optimum spacing could lie at $$0.5 \times \lambda (=0.5 \times 34 \text{ cm}=17 \text{ cm})$$

in particular if for example the UHF-RFID antenna system operates at a frequency of 868 MHz.

The patch antennae do not necessarily have to be identically constructed or be the same size however. They do not necessarily have to be arranged side by side and exactly horizontally offset, i.e. in the direction parallel to the passage direction 3', either (wherein it has been assumed in the illustrated embodiment that the passage direction 3' running in the horizontal direction runs parallel to the floor space 5).

Figure 5:
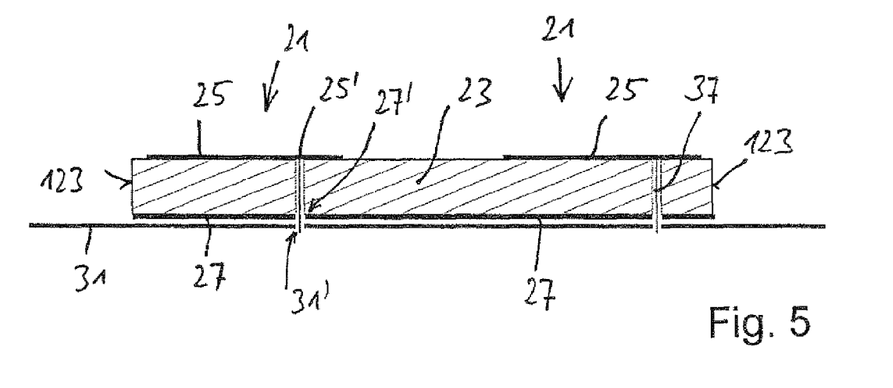
FIG. 5 shows an embodiment modified with respect to FIG. 3 and in a cross-sectional view.

It is also indicated with reference to FIG. 5 that a cooperating patch antenna pair basically does not categorically have to be formed from two individual patch antennae 21 as a whole, but can have a common construction.

The patch antenna pair according to FIG. 5 has a common ground plane 27 on the lower side of a common substrate 23, the two patch planes 25 that are separated from each other then being formed on the upper side of the substrate 23 and being fed by a separate feeder 37 which ends at a feeding point 25' on the associated patch planes 25. The patch antenna pair thus formed is arranged at a slight spacing above the common ground plane 31, so the ground plane 27 runs on the lower side of the substrate at a slight spacing from the common ground plane 31.

The patch antenna pairs partially shown in the figures are arranged so as to be mutually offset in the passage direction 3'. They do not have to be arranged exactly parallel to the passage direction 3' in the process. In particular the side spacing from a vertical plane lying in the passage direction 3' to the relevant patch plane 25 of a patch antenna 21 could also be different if, for example, the passage dramatically widens or narrows. Said patch antenna pair constitutes a basic embodiment of the invention in which at least two patch antennae 21 form a first group A of cooperating patch antennae 21. Even more patch antennae, for example three patch antennae, etc., could be arranged so as to be mutually offset in the passage direction, or with one component mutually offset in the passage direction, however.

Figure 6:
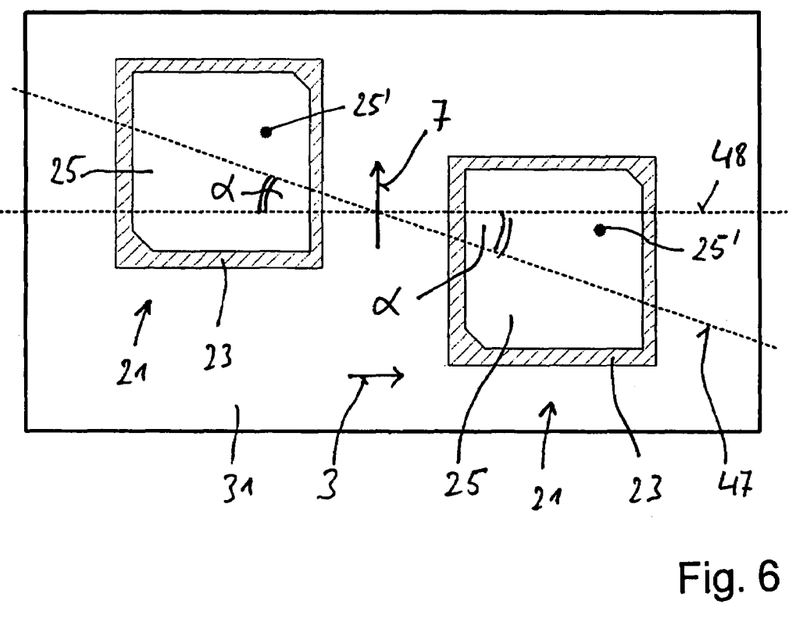
FIG. 6 shows an embodiment of a patch antenna pair that differs from FIGS. 3 and 4.

With the aid of FIG. 6 it is shown that a cooperating pair of patch antenna 21 of this type may also be arranged with a certain mutual offset in the height or vertical direction in addition to in the passage direction 3'. A maximum difference in the height and/or vertical direction is preferably undertaken in such a way however that a straight line 47 laid through the center points or centers of gravity of the associated patch antenna pair encloses an angle α, with respect to a horizontal plane or to a plane 48 running parallel to the passageway or the floor space 5, which is less than or equal to 45°.

In addition however the patch antennae shown in FIGS. 1 to 6 could also be arranged so as to be mutually rotated, so in the case of one patch antenna the feeding point 25' is located more at the top and in the case of the adjacent patch antenna more at the bottom and in the case of one antenna more on the right-hand side and in the case of the other patch antenna for example more on the left-hand side, etc. There are basically no restrictions here either.

Figure 7:
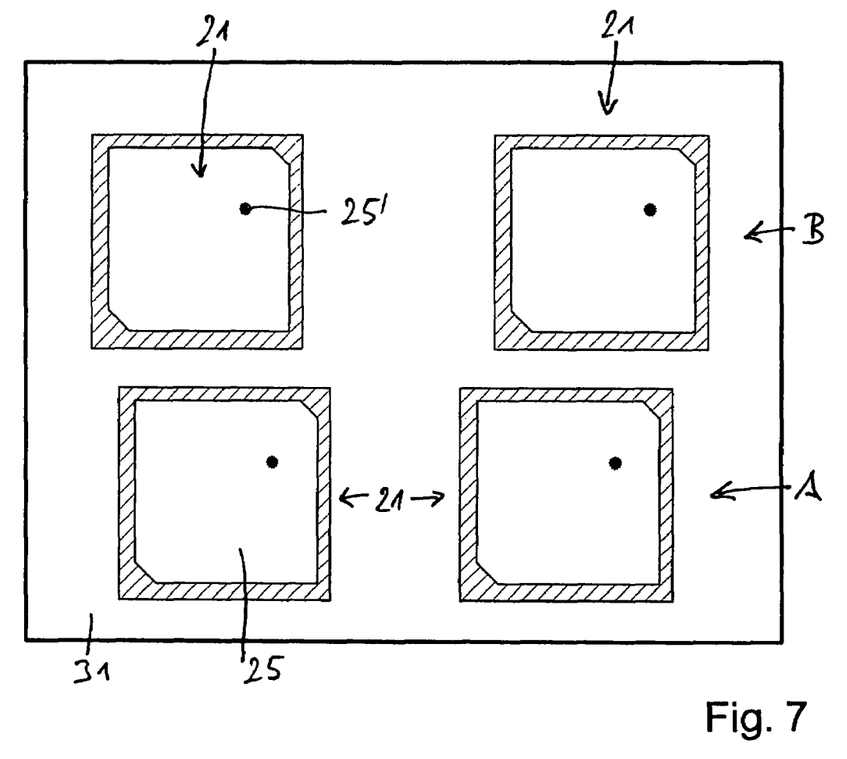
FIG. 7 shows a further modified embodiment in plan view of the patch antennae used.

With the aid of FIG. 7 it is shown that for example one group of four patch antennae 21 or a plurality of groups of two or four, etc. can be used in an antenna device 1.

In the embodiment according to FIG. 7 there is provided in addition to a bottom or lower group of patch antennae A (in the illustrated embodiment in the form of a patch antenna pair A) a second group of patch antennae B that is located higher in comparison (in the illustrated embodiment in the form of a higher patch antenna pair B), the higher patch antenna pair B being arranged at an equal height or vertical offset (although this does not have to be the case) but being differently positioned in the passage direction 3' with respect to the lower patch antenna pair A. This results in a greater lateral offset 43 to 45 between the two patch antennae 21 of the patch antenna pair located further up. Each of said groups A and B or each further patch antenna group can—as already mentioned—also comprise more than two patch antennae which are arranged so as to be mutually offset in the passage direction, or mutually offset at least in one component in the passage direction.

In contrast to the illustrated embodiment the feeding points 25' can however come to rest at different points, i.e. do not all have the corresponding same alignment, as is indicated in FIG. 7.

The internal spacings 43 in the horizontal or passage direction 3' or in the height or vertical direction 7 can be of the order of magnitude of a few mm to a few cm (without categorical restriction to this size range).

This embodiment accordingly produces the further advantage that for example the lower row A of patch antennae 21 can be fed with a mutual phase offset in relation to the upper row B of patch antennae 21, so an electrical up-tilt, or depending on the arrangement, if desired, what is known as an electrical down-tilt may be produced. In other words the main direction of radiation or main lobe is thereby electrically pre-adjusted more in the ascending vertical orientation or more in the downwardly lowered vertical orientation. A certain fine adjustment of the monitored region may therefore be carried out hereby.

If for example said four patch antennae according to FIG. 7 are used more in the lower monitored region X1 (FIG. 1) according to FIG. 1, the patch antennae may be activated in such a way that the monitored region is electrically pre-adjusted more from the bottom floor upwards.

If a group of patch antennae of this type, illustrated with reference to FIG. 7, is used for example in the bottom region of the antenna device 1 (as FIG. 1 shows), a different phase activation with respect to the patch antennae arranged one above the other in the different rows or planes can take place in such a way that, for example, the main lobe or the main monitored region does not extend perpendicular to the ground plane 31 of the patch antennae but is oriented so as to extend upwards in the vertical direction with one component.

If a corresponding patch antenna group according to FIG. 7 is inserted for example in the upper region X2 (FIG. 1) of the antenna device 1, a different phase feed can be undertaken here in such a way for example that the main direction of radiation of the patch antenna is oriented in a specific angular range more so as to extend downward into the monitored region.

However, the different phase activation between the two patch antennae 21 of a group A and/or B arranged adjacent and side by side at approximately the same height can also take place in such a way that the orientation of the monitored region is deflected according to the main direction of radiation (direction of the main lobe) of the patch antennae in one direction or in an opposite direction, based on the passageway 3, out of a center plane of symmetry that extends transversely thereto.

Figure 2:
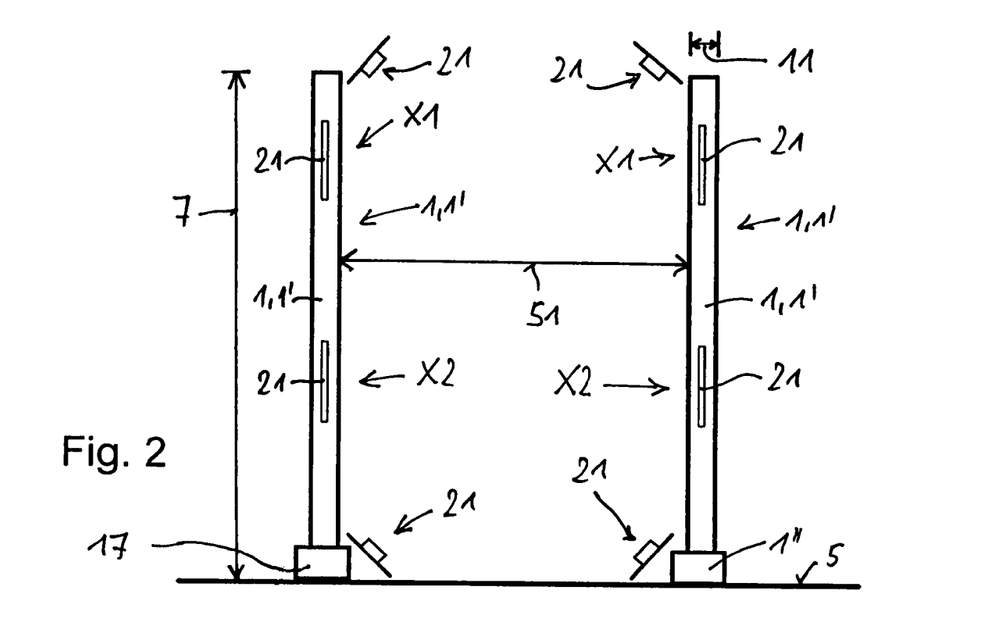
FIG. 2 shows a schematic elevation in the passage viewing direction of the UHF antenna arrangement according to the invention for an electronic article surveillance system (EAS)

With the aid of FIG. 2 it is shown only schematically that, also by way of addition, additional patch antennae 21 may be provided for example in the floor region or ceiling region or for example at the foot region 1'' of the antenna device 1 (or also at the upper end region of the antenna device 1). Individual patch antenna may also be used here. Preferably however a plurality of patch antennae that are each mutually offset in the passage direction, or with one component mutually offset in the passage direction, are used here as well, at least one respective pair of patch antennae or for example three, four or more patch antennae. In particular the patch antennae provided at the lower foot region or at the upper end region may also be oriented so as to be mechanically upwardly or downwardly pre-adjusted, in particular if electronic radiation forming and orientation, as described above with reference to FIG. 7, is not undertaken. If the patch antennae described in the lower or upper region of the side parts 1' or in the floor region or above the passageway (for example in a ceiling or suspended therefrom) are used as additional patch antennae, individual patch antennae may also be used in this case. Preferably however two or more patch antennae that are located side by side and are offset in the passage direction, or at least with one component mutually offset in the passage direction, are also used here, the antennae thus forming groups of patch antennae which cooperate.

With the aid of FIGS. 1 and 2 and 8 it is also shown that for example the two side antenna devices 1, i.e. the two side limits 1', can be arranged at a side spacing 51 from each other, which for example can vary between 0.8 m and 2.5 m, in particular between 1.4 and 2.0 m (it also being possible to fall below or exceed these limits).

The lateral antenna device 1, i.e. the side limit 1', preferably has a height 7 which, for example, can be 1 m to 1.80 m or 2 m on average.

The height of a patch antenna or a patch antenna pair, i.e. in particular the associated ground plane 31, can for example preferably be between 5 cm to 40 cm.

Figure 8:
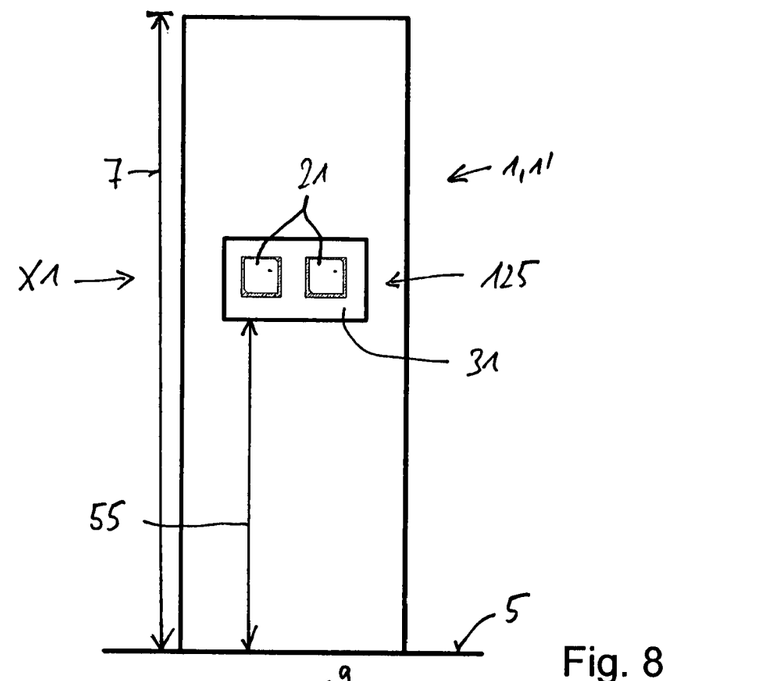
FIG. 8 shows a further detailed view of a possible variation.

If two patch antenna combinations 125*a* and 125*b* are used according to FIG. 1, 2 or 8 (i.e. for example a patch antenna combination A and a patch antenna combination B which are provided in the lower region X1 and in the upper region X2 according to FIG. 1, 2 or 8), the spacing 55 of the lower patch antenna combination 125*a* from the floor space should be at least 0.5 to 1.0 m. The spacing 57 between the lower patch antenna combination 125*a* and the upper patch antenna combination 125*b* should preferably be between 0.1 m and 2 m, in particular around 0.2 m to 1.2 m. The spacing can also be greater as desired if particularly high side limits 1' are used and the upper antenna devices should be located in a particular way.

Figure 9:
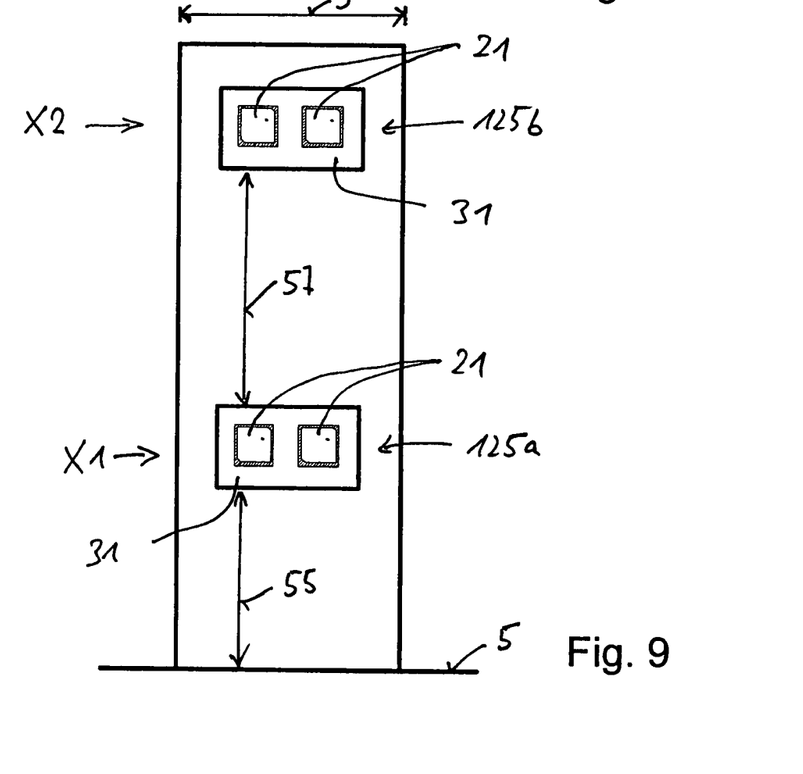
FIG. 9 shows a simplified variant in a view corresponding to FIG. 8.

If only one patch antenna combination with associated ground plane 31 is used, as is shown by way of example with the aid of FIG. 9, the spacing of this patch antenna combination 125 from the floor 5 should have a size of at least 0.5 m or more, it being possible for the overall height of the arrangement to again be 1 to 2 m.

The patch antennae 21 used for making possible an electronic goods identification system (GIS) preferably operate in the UHF frequency ranger i.e. for example in a 800 MHz to 950 MHz or 1,000 MHz range (in particular in the range of 868 MHz). If this GIS system is used in addition to a conventional EAS surveillance system, which operates without said patch antennae, a conventional surveillance system is preferably used which operates for example in the 10 Hz to 20 kHz range (in particular in the case of electromagnetic EAS methods) or for example in the 5 MHz to 10 MHz range (for example around 8.2 MHz) if in particular a radio frequency EAS method is involved.

The patch antenna used according to the invention are used for an RFID surveillance system, so products, goods and/or people, etc. to be monitored may be detected if they still carry an RFID tag which can be recognized when passing through and along the passageway and the corresponding information can be read-out and evaluated by means of a "reader" provided for this purpose.

The system according to the invention has been described in particular with reference to a passageway. The surveillance system with a door along a passageway described with reference to FIGS. 1 and 2 can however also be constructed in such a way that corresponding side limits are arranged repeatedly side by side with lateral spacing, for example five side limits 1', whereby four passageways 3 located parallel and side by side are defined. In the central antenna devices 1 (i.e. not in the outermost antenna devices 1) patch antennae are in each case installed such that some of them radiate in one direction and some in the opposite direction to detect the two passageways.

Basically said antenna devices 1 for monitoring a passageway are inserted are used in such a way that one pair respectively of antenna devices 1 of this type is provided, i.e. one corresponding antenna device 1 respectively or one side limit 1', which are arranged so as to oppose the passageway for monitoring.

The invention claimed is:

1. An RFID antenna system for a goods identification system (GIS) comprising:
    at least one RFID antenna device read out from RFID tags equipped with a microchip,
    the at least one RFID antenna device being arranged at least on one side of a passageway or passage region for monitoring, and on two opposing sides with respect to a passageway or passage region extending therebetween, laterally offset from each other and therefore transversely to a passage direction,
    the RFID antenna device and/or a side limit receiving the RFID antenna device comprising at least two antennas
    the at least two antennas for the goods identification system (GIS) comprising patch antennas,
    the at least two patch antennas being arranged mutually offset in the direction of the passageway or passage region, or at least with one component mutually offset in the passage direction, and
    the at least two patch antennas being arranged at an equal spacing from a floor space of the passageway and/or on the same horizontal plane or offset thereto, in such a way that a straight line laid through the center points and/or centers of gravity of at least two adjacent patch antennas encloses an angle α with respect to a horizontal plane and/or a plane that is parallel to the floor space, which angle is ≦45°.

2. The RFID antenna system as claimed in claim 1, wherein in the passage direction more than two patch antennas are arranged laterally offset from each other.

3. The RFID antenna system as claimed in claim 1, wherein a plurality of groups (A, B) consisting of two more patch antennas arranged laterally offset from each other are arranged at different levels to each other, at different levels relative to the level of the floor space.

4. The RFID antenna system as claimed in claim 3, wherein two groups (A, B) of patch antennas arranged at different levels to each other are activated with different phase angles to generate a different up-tilt or down-tilt angle.

5. The RFID antenna system as claimed in claim 3, wherein at least two patch antennas of a group (A, B) of patch antennas, are mutually offset in the passage direction, are activated with different phase angles, whereby the monitored region can be adjusted in one direction or in the opposite direction to the passage direction.

6. The RFID antenna system as claimed in claim 1, wherein only one or a plurality of cooperating group(s) (A, B) of patch antenna are provided in an RFID antenna device.

7. The RFID antenna system as claimed in claim 6, wherein the at least one or more cooperating group(s) of patch antennas are arranged at a level with respect to the passageway and/or the floor space of the passageway which is ≧0.3 m and ≦2 m.

8. The RFID antenna system as claimed in claim 1, wherein a plurality of regions (X1, X2) are provided with one or more cooperating group(s) (A, B) of patch antennas which on the one hand are arranged in a low level region of the RFID antenna device or side limits and a region of the RFID antenna device or the side limits that is higher in comparison.

9. The RFID antenna system as claimed in claim 8, wherein antenna devices arranged between two regions (X1, X2) that are provided offset in the vertical and/or height direction and each comprising one or more cooperating groups (A, B) of patch antennas have a vertical spacing of at least 0.1 m and preferably less than 2.0 m, and in that the vertical spacing of the lowest patch antennas, or a lowest group of patch antennae, from the floor space of the passageway is in the range of 0.3 m to 1.5 m.

10. The RFID antenna system as claimed in claim 1, wherein the patch antennas radiate in the UHF range.

11. The RFID antenna system as claimed in claim 1, wherein the patch antennas comprise a patch plane a substrate situated therebelow and a ground plane situated therebelow, and in that the patch antenna thus formed is capacitively arranged upstream of a ground plane or is connected via direct current or conductively to the ground plane, the patch antenna and the ground plane being oriented transversely and preferably perpendicularly to the passageway and/or to the passage direction.

12. The RFID antenna system as claimed in claim 1, wherein the patch antenna comprises a patch plane, a substrate situated therebelow and a ground plane, the patch antenna and the ground plane being oriented transversely and preferably perpendicularly to the passageway and/or to the passage direction.

13. The RFID antenna system as claimed in claim 11, wherein the substrate consists of a dielectric body.

14. The RFID antenna system as claimed in claim 11, wherein the substrate consists of air and the electrical spacers are provided for positioning and retaining the patch plane.

15. The RFID antenna system as claimed in claim 1, wherein at least one group (A, B) of patch antennas comprises at least two mutually offset patch antennae, the antennae being arranged upstream of a common ground plane.

16. RFID antenna system as claimed in claim 15, wherein a group (A, B) of at least two patch antennas comprise a common substrate, on the back of which a common ground plane is preferably provided, at least two patch planes that are electrically isolated being formed on the radiator side on the substrate so as to oppose the ground plane.

17. The RFID antenna system as claimed in claim 6, wherein each patch antenna comprises a feeder which passes through a through-opening in the ground plane, an adjoining through-opening in the respective ground plane of the patch antenna and an adjoining channel which extends through the substrate as far as a feeding point on the patch plane, the feeding point preferably being located on the lower side of the patch plane.

18. The RFID antenna system as claimed in claim 1, wherein a group (A, B) of patch antennas is arranged upstream of a common ground plane, of which the vertical extent is preferably between 5 cm and 40 cm.

19. The RFID antenna system as claimed in claim 1, wherein additional patch antennas are preferably provided which are preferably provided in the lower region of the RFID antenna device and/or the side limit at the transition region to the floor space, of which the main direction of radiation and/or patch plane is preferably pre-aligned with an upwardly pointing vertical component.

20. The RFID antenna system as claimed in claim 1, wherein one or more patch antenna(s) are preferably provided at the upper end region of the RFID antenna device and/or the side limit, of which the main direction of radiation and/or patch plane is assembled so as to be pre-aligned with a downwardly directed vertical component.

21. The RFID antenna system as claimed in claim 1, wherein at least two patch antennas that are mutually offset in the passage direction and/or at least two patch antennas that are mutually offset in the height and/or vertical direction are provided which are activated with a different phase and preferably a differently adjustable phase.

22. The RFID antenna system as claimed in claim 1, wherein, preferably in the region of the floor space and/or above the passageway, at least one and preferably a plurality of patch antenna(s) is/are provided so as to be mutually offset in the passage direction.

23. RFID antenna system as claimed in claim 1, wherein the patch antennas can be retrofitted and/or integrated in antennas and/or frame antennas that form part of an electronic article surveillance system (EAS).

24. The RFID antenna system as claimed in claim 1, wherein a plurality of RFID antenna devices and/or side limits with lateral offset are disposed thereby forming a plurality of passageways extending therebetween, patch antennas being fitted in the middle RFID antenna devices and/or side limits, some of the antennas radiating in one direction and some in the opposing direction to monitor two passageways that are located adjacent to each other.

25. The RFID antenna system as claimed in claim 1, wherein frame antennae that form part of an article surveillance system (EAS) are provided, and in that at least one patch antenna is integrated in a frame antenna, and in that preferably the patch antennas are integrated inside the frame antennas in a plan view of the frame antennas.

* * * * *